(12) United States Patent
Petro-Roy (10) Patent No.: US 11,157,034 B2
(45) Date of Patent: Oct. 26, 2021

(54) THROTTLE PEDAL ASSEMBLY

(71) Applicant: MARINE ACQUISITION (US) INCORPORATED, Limerick, PA (US)

(72) Inventor: Mark Douglas Petro-Roy, Lansdale, PA (US)

(73) Assignee: Marine Acquisition (US) Incorporated, Limerick, PA (US)

( * ) Notice: Subject to any disclaimer, the term of this patent is extended or adjusted under 35 U.S.C. 154(b) by 0 days.

(21) Appl. No.: 17/039,678

(22) Filed: Sep. 30, 2020

(65) Prior Publication Data

US 2021/0096590 A1    Apr. 1, 2021

Related U.S. Application Data

(60) Provisional application No. 62/908,522, filed on Sep. 30, 2019.

(51) Int. Cl.

| | |
|---|---|
| *G05G 1/30* | (2008.04) |
| *G05G 1/405* | (2008.04) |
| *G05G 1/44* | (2008.04) |
| *B60K 26/02* | (2006.01) |
| *B63H 21/21* | (2006.01) |
| *G05G 1/38* | (2008.04) |

(52) U.S. Cl.
CPC ............. *G05G 1/405* (2013.01); *B60K 26/02* (2013.01); *B63H 21/21* (2013.01); *G05G 1/38* (2013.01); *G05G 1/44* (2013.01); *B60K 2026/026* (2013.01)

(58) Field of Classification Search
CPC .. G05G 1/30; G05G 1/38; G05G 1/40; G05G 1/405; G05G 1/44; G05G 1/445; G05G 1/46; B60K 2026/026; B60K 26/02; B60T 7/06; B60T 7/04
See application file for complete search history.

(56) References Cited

U.S. PATENT DOCUMENTS

| | | | | |
|---|---|---|---|---|
| 2,985,031 | A * | 5/1961 | Bennett ................ | B63H 21/213 74/512 |
| 3,002,398 | A * | 10/1961 | Beamer .................... | G05G 7/10 74/512 |
| 5,529,296 | A * | 6/1996 | Kato .................... | B60K 26/021 267/155 |
| 5,865,068 | A * | 2/1999 | Huntley ................... | G05G 1/30 114/153 |

(Continued)

*Primary Examiner* — Richard W Ridley
*Assistant Examiner* — Brian J McGovern (57) ABSTRACT

A throttle pedal assembly may include: a base; a pedal movably mounted on the base; and an adjustment member extending at least between a first reference location of the throttle pedal assembly and an adjustment surface at an end of the adjustment member. The adjustment member may be adjustable to adjust an adjustment distance from the first reference location of the throttle pedal assembly to the adjustment surface. The throttle pedal assembly may be operable to indicate a throttle level according to relative positions of a second reference location of the throttle pedal assembly and a third reference location of the throttle pedal assembly. Adjusting the adjustment distance may cause an idle position of the pedal to move relative to base and maintains relative positions of the second and third reference locations when the pedal is in the idle position.

20 Claims, 10 Drawing Sheets

(56) References Cited

U.S. PATENT DOCUMENTS

| | | | | |
|---|---|---|---|---|
| 6,058,796 | A * | 5/2000 | Huntley | G05G 1/30 |
| | | | | 114/153 |
| 6,223,623 | B1 * | 5/2001 | Vance | G05G 1/30 |
| | | | | 114/153 |
| 6,389,927 | B1 * | 5/2002 | Willemsen | G05G 1/405 |
| | | | | 74/514 |
| 6,536,300 | B1 | 3/2003 | Gonring | |
| 2009/0038431 | A1 * | 2/2009 | Willemsen | G05G 25/02 |
| | | | | 74/512 |
| 2009/0223319 | A1 * | 9/2009 | Choi | G05G 1/36 |
| | | | | 74/512 |
| 2011/0132134 | A1 * | 6/2011 | Kim | G05G 1/30 |
| | | | | 74/514 |
| 2020/0070656 | A1 | 5/2020 | Ward et al. | |

\* cited by examiner

THROTTLE PEDAL ASSEMBLY

CROSS-REFERENCE TO RELATED APPLICATION

This application claims the benefit of U.S. provisional patent application No. 62/908,522 filed on Sep. 30, 2019, the entire contents of which are incorporated by reference herein.

FIELD

This disclosure relates generally to a throttle pedal assembly.

RELATED ART

Some throttle pedal assemblies may not be adjustable in a desirable way.

SUMMARY

According to at least one embodiment, there is provided a throttle pedal assembly comprising a base, a pedal pivotably mounted on the base and pivotable about a first axis, a housing (or support housing), and a sensor being disposed in the housing. The sensor includes a sensed element and a sensing element. The sensed element is coupled to the pedal and is rotatable about the first axis. The sensing element is rotatable about a second axis which is coaxial with the first axis. There is also an adjustment member. Adjustment or replacement of the adjustment member causes the pedal to pivot about the first axis, the sensed element to rotate about the first axis, and the sensing element to rotate about the second axis, such that there is no relative displacement of the sensed element and the sensing element. A spring may apply a constant force to the sensing element to maintain a position of the sensing element.

According to at least one embodiment, there is provided a throttle pedal assembly comprising a base, a pedal pivotably mounted on the base and pivotable about a first axis, a housing, and a sensor being disposed in the housing. The sensor includes a sensing element and a sensed element. The sensing element is coupled to the pedal and is rotatable about the first axis. The sensed element is rotatable about a second axis which is coaxial with the first axis. There is also an adjustment member. Adjustment or replacement of the adjustment member causes the pedal to pivot about the first axis, the sensing element to rotate about the first axis, and the sensed element to rotate about the second axis, such that there is no relative displacement of the sensing element and the sensed element.

According to at least one embodiment, there is disclosed a throttle pedal assembly comprising: a base; a pedal movably mounted on the base; and an adjustment member extending at least between a first reference location of the throttle pedal assembly and an adjustment surface at an end of the adjustment member, the adjustment member adjustable to adjust an adjustment distance from the first reference location of the throttle pedal assembly to the adjustment surface; wherein the throttle pedal assembly is operable to indicate a throttle level according to relative positions of a second reference location of the throttle pedal assembly and a third reference location of the throttle pedal assembly; and wherein adjusting the adjustment distance causes an idle position of the pedal to move relative to base and maintains relative positions of the second and third reference locations when the pedal is in the idle position.

In some embodiments, the adjustment surface is continuously movable relative to the first reference location of the throttle pedal assembly such that the adjustment distance is continuously adjustable.

In some embodiments, the pedal is pivotably mounted on the base and pivotable about a first axis relative to the base.

In some embodiments, the throttle pedal assembly further comprises: a sensed element, wherein the second reference location is on the sensed element; and a sensing element, wherein the third reference location is on the sensing element.

In some embodiments: the sensed element is coupled to the pedal such that the sensed element rotates about the first axis relative to the base in response to pivoting of the pedal relative to the base about the first axis; and the sensing element is rotatable about a second axis coaxial with the first axis.

In some embodiments: the sensing element is coupled to the pedal such that the sensing element rotates about the first axis relative to the base in response to pivoting of the pedal relative to the base about the first axis; and the sensed element is rotatable relative to the base about a second axis coaxial with the first axis.

In some embodiments, the sensed element comprises a magnet.

In some embodiments, the first reference location is fixed relative to the base.

In some embodiments, the adjustment member is threadedly movable relative to the base.

In some embodiments, the throttle pedal assembly further comprises a carrier rotatable relative to the base about a second axis coaxial with the first axis. In some embodiments: the second reference location rotates about the first axis relative to the base in response to pivoting of the pedal relative to the base about the first axis; and the third reference location is on the carrier.

In some embodiments, the carrier comprises a carrier surface engaged with the adjustment surface, and the pedal engages with the adjustment surface when the pedal is in the idle position, such that adjusting the adjustment distance causes: the idle position of the pedal to rotate relative to base; and the carrier to rotate with the idle position of the pedal about the second axis relative to the base.

In some embodiments, the throttle pedal assembly further comprises a carrier movable relative to the base. In some embodiments: the first reference location is fixed relative to the base; the second reference location moves relative to the base in response to movement of the pedal relative to the base; and the third reference location is on the carrier. In some embodiments, the carrier comprises a carrier surface engaged with the adjustment surface, and the pedal engages with the adjustment surface when the pedal is in the idle position, such that adjusting the adjustment distance causes: the idle position of the pedal to move relative to base; and the carrier to move with the idle position of the pedal.

In some embodiments, the throttle pedal assembly further comprises: a sensed element, wherein the second reference location is on the sensed element; and a sensing element, wherein the third reference location is on the sensing element.

In some embodiments, the throttle pedal assembly further comprises: a sensed element, wherein the third reference location is on the sensed element; and a sensing element, wherein the second reference location is on the sensing element.

In some embodiments, the first reference location is fixed relative to the pedal.

In some embodiments, the adjustment member is threadedly movable relative to the pedal.

In some embodiments, the throttle pedal assembly further comprises a throttle level body movably mounted on the base. In some embodiments: the second reference location is on the throttle level body; and the third reference location is on the base.

In some embodiments, the throttle level body is rotatable relative to the base about a second axis coaxial with the first axis.

In some embodiments, the adjustment surface engages a surface of the throttle level body such that adjusting the adjustment distance causes the idle position of the pedal to move relative to base and to the throttle level body.

In some embodiments, the throttle pedal assembly further comprises a throttle level body movably mounted on the base. In some embodiments: the first reference location is fixed relative to the pedal; the second reference location is on the throttle level body; the third reference location is on the base; and the adjustment surface engages a surface of the throttle level body such that adjusting the adjustment distance causes the idle position of the pedal to move relative to base and to the throttle level body.

Other aspects and features will become apparent to those ordinarily skilled in the art upon review of the following description of illustrative embodiments in conjunction with the accompanying figures.

BRIEF DESCRIPTION OF THE DRAWINGS

The disclosure will be more readily understood from the following description of the embodiments thereof given, by way of example only, with reference to the accompanying drawings, in which.

DETAILED DESCRIPTION

Figure 1:
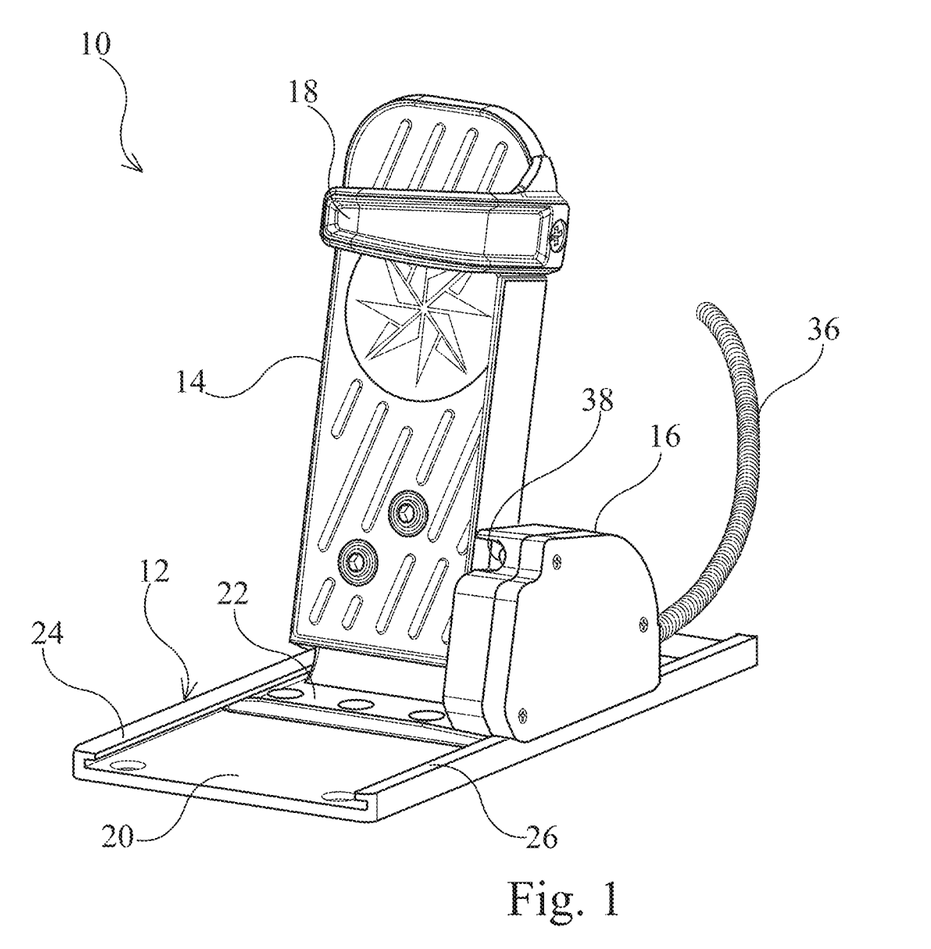
FIG. 1 is a front perspective view of a throttle pedal assembly according to one embodiment.

Referring to the drawings and first to FIG. 1, there is shown a throttle pedal assembly 10 according to one embodiment. The throttle pedal assembly 10 generally comprises a base 12, a pedal 14 pivotally mounted (or, more generally, movably mounted) on the base 12, and a support housing 16 coupled to the pedal 14. The pedal 14 may be made of aluminum and is provided with a toe hook 18 in this example, but this is not required. The base 12 of the throttle pedal assembly 10 may be made of aluminum and includes a base plate 20 and a slider plate 22. The base plate 20 is provided with rails 24 and 26 which receive the slider plate 22. The base plate 20 is configured to be mounted on a floor of a vehicle, for example a marine vessel, and the slider plate 22 is able to slide relative to the base plate 20. The pedal 14 is mounted on the slider plate 22 and is accordingly also able to slide relative to the base plate 20. This allows the pedal 14 to be positioned in a desired location relative to the base plate 20 and thereby positioned in a desired location relative to the marine vessel or other vehicle.

Figure 2:
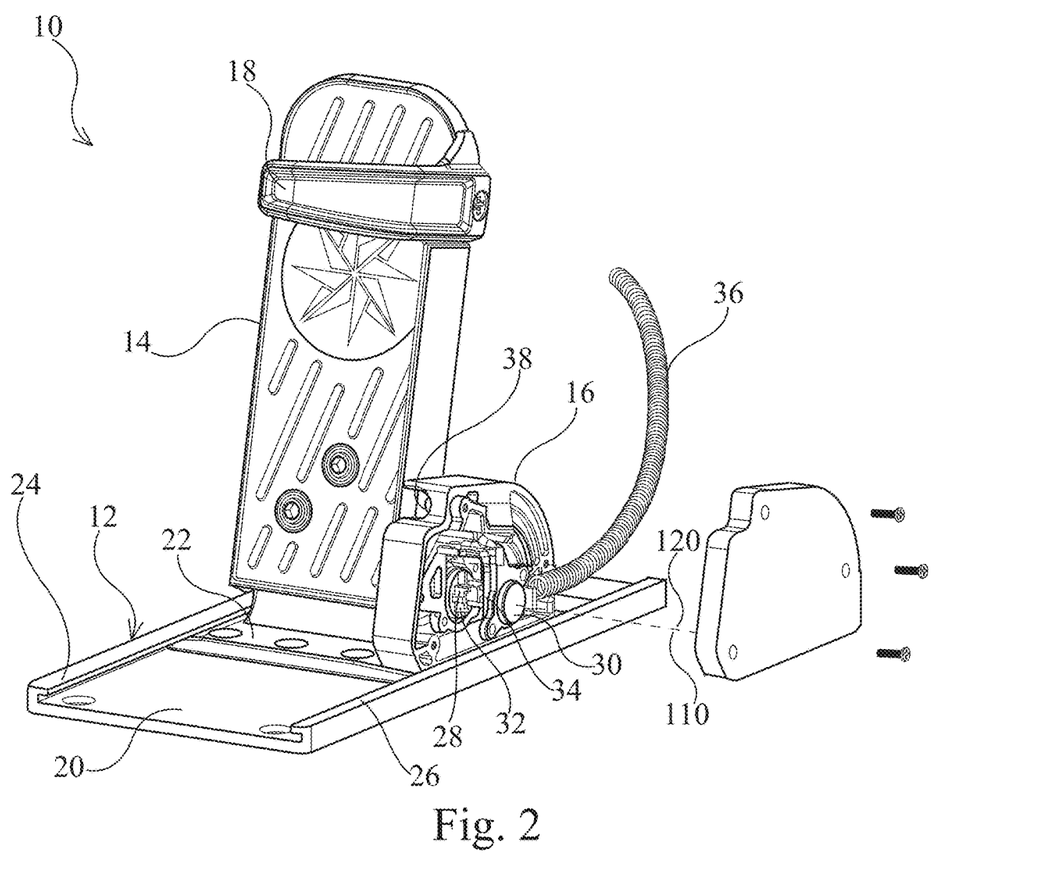
FIG. 2 is an exploded, front perspective view of the throttle pedal assembly of FIG. 1.

The support housing 16 may be made of aluminum and, as shown in FIG. 2, houses a magnet rotor 28 and a sensor carrier (or carrier) 30 that may be made of aluminum. The magnet rotor 28 includes a magnet 32, i.e. a sensed element, and is coupled to the pedal 14. The pedal 14 is pivotable about a first axis 110 relative to the slider plate 22 (and relative to the base plate 20 and the base 12 as a whole when the slider plate 22 is held in a fixed position relative to the base plate 20). For example, the pedal 14 may be pivotable about a shaft, and the shaft may be supported by two nylon bushings held in place relative to the slider plate 22. Pivoting of the pedal 14 about the first axis 110 causes the magnet rotor 28 to rotate about the first axis 110 relative to the slider plate 22 (and relative to the base plate 20 and the base 12 as a whole when the slider plate 22 is held in a fixed position relative to the base plate 20).

The sensor carrier 30 includes a sensing element 34 (such as a Hall sensor or other sensor of a magnetic field of the magnet 32) and is mounted in the support housing 16. The sensor carrier 30 is rotatable relative to the slider plate 22 (and relative to the base plate 20 and the base 12 as a whole when the slider plate 22 is held in a fixed position relative to the base plate 20) about a second axis 120. The sensing element 34 rotates or otherwise moves with the sensor carrier 30. The first axis 110 and the second axis 120 are coaxial axes.

Figure 3:
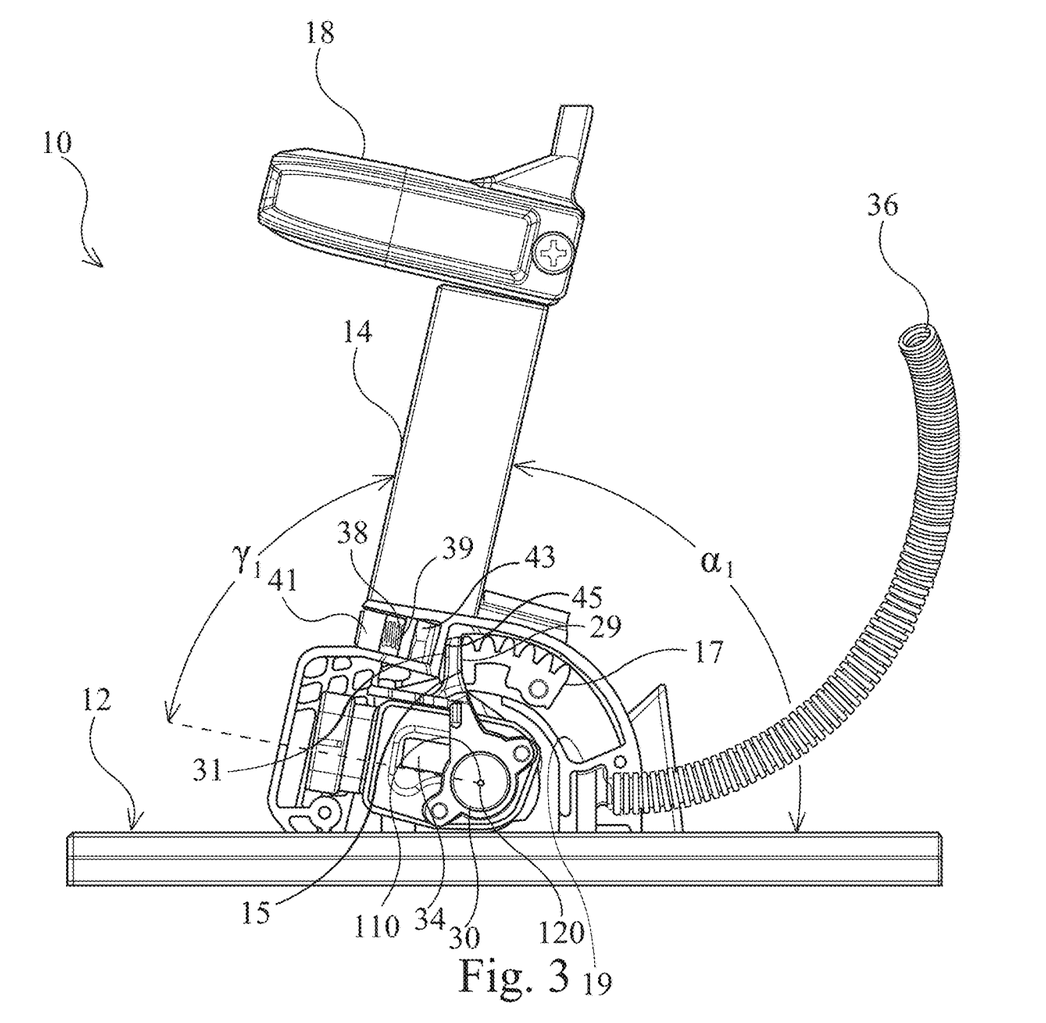
FIG. 3 is a broken-away, side elevation view of the throttle pedal assembly of FIG. 1, showing a pedal of the throttle pedal assembly of FIG. 1 in an initial idle position.

Referring to FIG. 3, an adjustment member 38 includes a threaded shaft 39 coupled to a head 41. The threaded shaft 39 threadedly engages a threaded opening in a threaded body 43 that is held in a fixed position relative to the slider plate 22 (shown in FIGS. 1 and 2), and is therefore held in a fixed position relative to the base plate 20 and the base 12 as a whole (also shown in FIGS. 1 and 2) when the slider plate 22 is held in a fixed position relative to the base plate 20. The adjustment member 38 also includes an adjustment surface 45 at an end of the adjustment member 38 opposite the head 41. Rotation of the adjustment member 38 within the threaded opening in the threaded body 43 moves the adjustment member 38, and thus the adjustment surface 45, relative to the threaded body 43 and thus relative to the slider plate 22 (and relative to the base plate 20 and the base 12 as a whole when the slider plate 22 is held in a fixed position relative to the base plate 20). The threaded body 43 may therefore be referred to as a first reference location fixed relative to the slider plate 22 (and relative to the base plate 20 and the base 12 as a whole when the slider plate 22 is held in a fixed position relative to the base plate 20), and a distance of the adjustment surface 45 from the first reference location may be adjusted by rotating the adjustment member 38 within the threaded opening in the threaded body 43.

The adjustment member 38 is an example only, and alternative embodiments may vary. For example, in alternative embodiments, a distance of an adjustment surface from a first reference location may be adjusted other than by rotation of an adjustment member, for example by replacement of an adjustment member.

The sensor carrier 30 includes a carrier surface 31, and the sensor carrier 30 is rotatable about the second axis 120 such that the carrier surface 31 is positionable against the adjustment surface 45. A spring or other resilient body (not shown) may provide a constant force to urge the sensor carrier 30 about the second axis 120 such that the carrier surface 31 is urged against the adjustment surface 45, and such that the carrier surface 31 is urged against and engages the adjustment surface 45. However, the carrier surface 31 may engage the adjustment surface 45 in other ways, for example by direct or indirect attachment of the adjustment surface 45 to the carrier surface 31. Therefore, during operation of the throttle pedal assembly 10 when distance of the adjustment surface 45 from the first reference location remains constant, the sensor carrier 30 and the sensing element 34 remain stationary relative to the slider plate 22 (and relative to the base plate 20 and the base 12 as a whole when the slider plate 22 is held in a fixed position relative to the base plate 20).

A spring or other resilient body (not shown) may urge the pedal 14 about the first axis 110 towards an idle position, although the pedal 14 may be urged about the first axis 110 towards an idle position in other ways. Alternatively, frictional forces may hold the pedal 14 in various positions about the first axis 110. A pedal surface 15 moves with the pedal 14 about the first axis 110, and urging the pedal 14 about the first axis 110 towards an idle position may involve urging the pedal surface 15 towards a surface 29 of the sensor carrier 30. In the embodiment shown, the surface 29 and the carrier surface 31 are on opposite sides of a projection of the sensor carrier 30 that projects generally radially relative to the second axis 120, although alternative embodiments may differ. Therefore, when the pedal 14 is in an idle position, the pedal surface 15 and the pedal 14 engage the surface 29 of the sensor carrier 30. Further, because the carrier surface 31 engages the adjustment surface 45, when the pedal 14 is in an idle position, the pedal 14 also engages the adjustment surface 45.

FIG. 3 shows the pedal 14 in an initial idle position which is typically set when the throttle pedal assembly 10 is installed on the marine vessel. In the initial idle position shown in FIG. 3, the adjustment surface 45 is a relatively small distance from the threaded body 43 (or first reference location), and the pedal surface 15 engages the surface 29 of the sensor carrier 30 such that the pedal 14 engages the adjustment surface 45.

Figure 4:
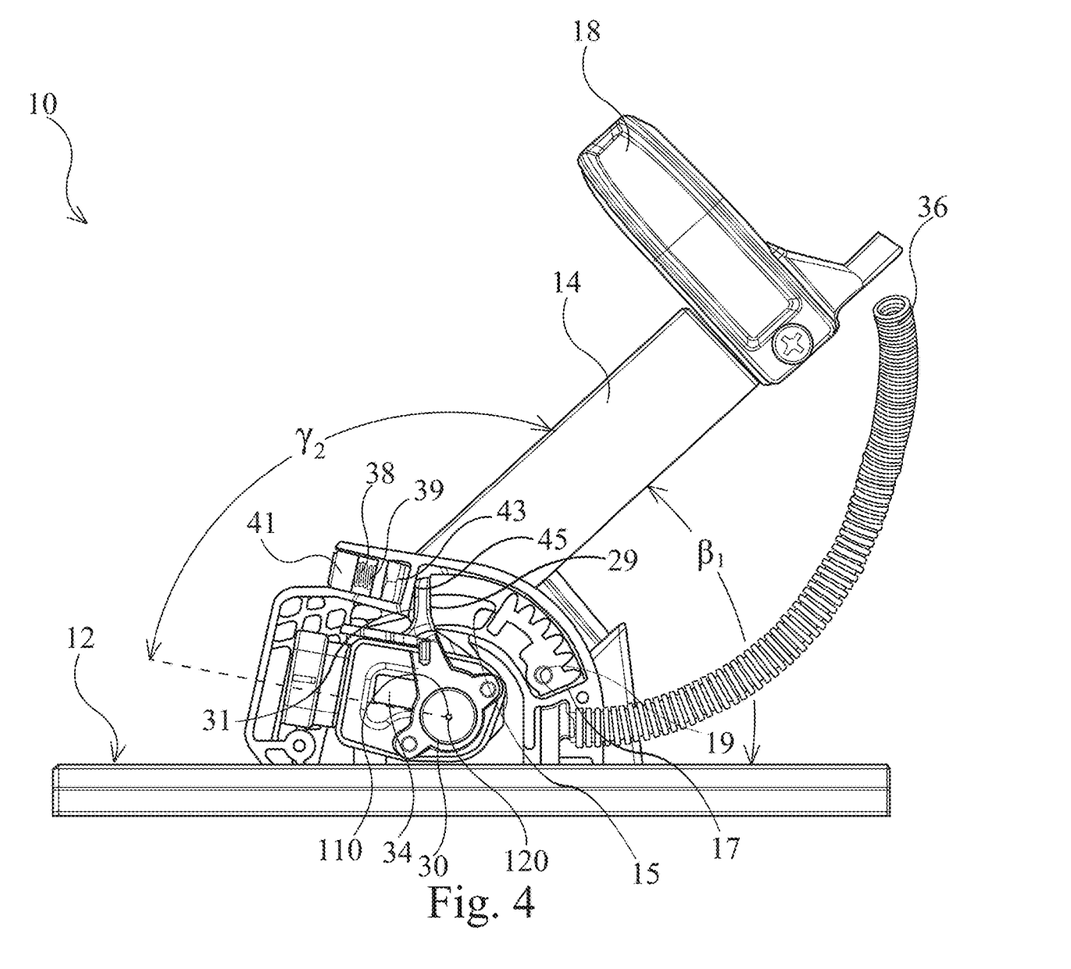
FIG. 4 is a broken-away, side elevation view of the throttle pedal assembly of FIG. 1, showing the pedal of the throttle pedal assembly of FIG. 1 moved from the initial idle position to an open throttle position.

When the pedal 14 is moved from the initial idle position with a pedal angle of $\alpha_1$, shown in FIG. 3, to an open throttle position with a pedal angle of $\beta_1$, shown in FIG. 4, the pedal 14 is pivoted about the first axis 110 thereby causing the magnet rotor 28 and the magnet 32 to rotate about the first axis 110. The rotational displacement of the magnet 32 is sensed by sensing element 34 which remains stationary when the pedal 14 is moved from the initial idle position shown in FIG. 3 to the open throttle position shown in FIG. 4. The sensing element 34 then alters a throttle signal, based on the rotational position of the magnet 32 relative to the sensing element 34, through wiring 36 to a controller (not shown) which controls throttle based on the throttle signal. For example, the throttle signal (or other throttle level indicated by the throttle pedal assembly 10) may be proportional to an angular displacement between the magnet 32 and the sensing element 34.

In other words, the magnet 32 (or sensed element) may have a second reference location, the sensing element 34 may have a third reference location, and the throttle pedal assembly 10 is operable to indicate a throttle level according to relative positions of the second reference location of the throttle pedal assembly and the third reference location. The throttle level indicated by the throttle pedal assembly 10 may control one or more engines, such as one or more engines of a marine vessel or other vehicle.

Like the pedal surface 15, a pedal surface 17 moves with the pedal 14 about the first axis 110, and in the open throttle position shown in FIG. 4, the pedal surface 17 may abut a surface 19 that is held in a fixed position relative to the slider plate 22. Therefore, in general, the surfaces 19 and 29 may define a range of motion of the pedal 14 relative to the slider plate 22. Alternatively, the surface 29 and another surface may define a range of motion of the pedal 14 relative to the slider plate 22, or the surface 29 and a resilient body may define a range of motion of the pedal 14 relative to the slider plate 22.

Although a sensed element in the embodiment shown includes the magnet 32, alternative embodiments may differ. For example, in some embodiments, the sensed element may include a potentiometer, and the sensing element may include a voltmeter operable to detect a voltage indicating relative positions of the sensed element and the sensing element. In another example, the sensed element may include an optical pattern or other optical indicia (such as a disk with lines, for example), and the sensing element may include an encoder or another optical sensor operable to sense optical signals indicating relative positions of the sensed element and the sensing element.

As indicated above, the carrier surface 31 engages the adjustment surface 45, and the pedal surface 15 and the pedal 14 engage the surface 29 of the sensor carrier 30 when the pedal 14 is in an idle position. Therefore, by adjusting the distance of the adjustment surface 45 from the threaded body 43 (or first reference location), for example by rotating the head 41 relative to the threaded body 43, the idle position of the pedal 14 may rotate about the first axis 110 (or, more generally, move) relative to the slider plate 22 (and relative to the base plate 20 and the base 12 as a whole when the slider plate 22 is held in a fixed position relative to the base plate 20), and the sensor carrier 30 may rotate about the second axis 120 (or, more generally, move) relative to the slider plate 22 (and relative to the base plate 20 and the base 12 as a whole when the slider plate 22 is held in a fixed position relative to the base plate 20) with the idle position of the pedal 14.

In other words, adjusting the distance of the adjustment surface 45 from the threaded body 43 (or first reference location) causes the idle position of the pedal 14 may rotate about the first axis 110 (or, more generally, move) relative to the slider plate 22 (and relative to the base plate 20 and the base 12 as a whole when the slider plate 22 is held in a fixed position relative to the base plate 20). Further, because adjusting the distance of the adjustment surface 45 from the threaded body 43 (or first reference location) causes the sensor carrier 30 to rotate about the second axis 120 (or, more generally, move) with the idle position of the pedal 14, and because pivoting of the pedal 14 about the first axis 110 causes the magnet rotor 28 to rotate about the first axis 110, adjusting the distance of the adjustment surface 45 from the threaded body 43 (or first reference location) causes the magnet 32 (or second reference location) when the pedal 14 is in an idle position to rotate (or, more generally, move) with the sensing element 34 (or third reference location), so adjusting the distance of the adjustment surface 45 from the threaded body 43 (or first reference location) maintains relative positions of the second and third reference locations when the pedal 14 is in the idle position.

Figure 5:
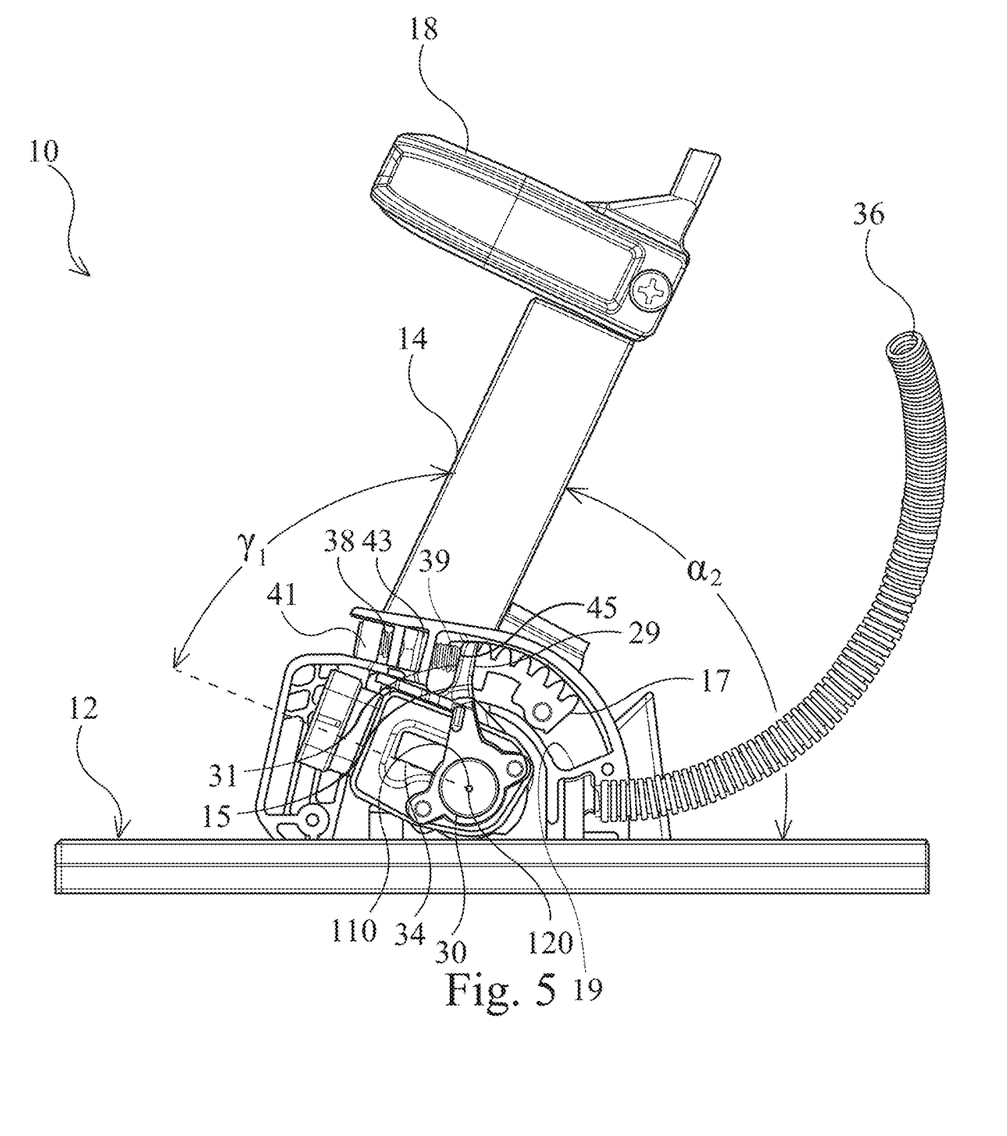
FIG. 5 is a broken-away, side elevation view of the throttle pedal assembly of FIG. 1, showing the pedal of the throttle pedal assembly of FIG. 1 in an adjusted idle position.

For example, the idle position of the pedal 14 may be adjusted from the initial idle position, shown in FIG. 3, to an adjusted idle position, shown in FIG. 5, for ergonomic considerations, for example. The pedal angle $\alpha_1$ in the initial idle position of FIG. 3 is different from a pedal angle $\alpha_2$ in the adjusted idle position of FIG. 5. The idle position of the pedal 14 is adjusted from the initial idle position to the adjusted idle position using the adjustment member 38, which simultaneously pivots the idle position of the pedal 14 about the first axis 110 and rotates the sensor carrier 30 and the sensing element 34 about the second axis 120. The magnet rotor 28 and the magnet 32 also rotate about the first axis 110 when the adjustment member 38 is employed to pivot the pedal about the first axis 110. There is accordingly no change in the throttle signal during the adjustment because there is no relative displacement angle $\gamma_1$ of a magnet 32 and the sensing element 34.

Figure 6:
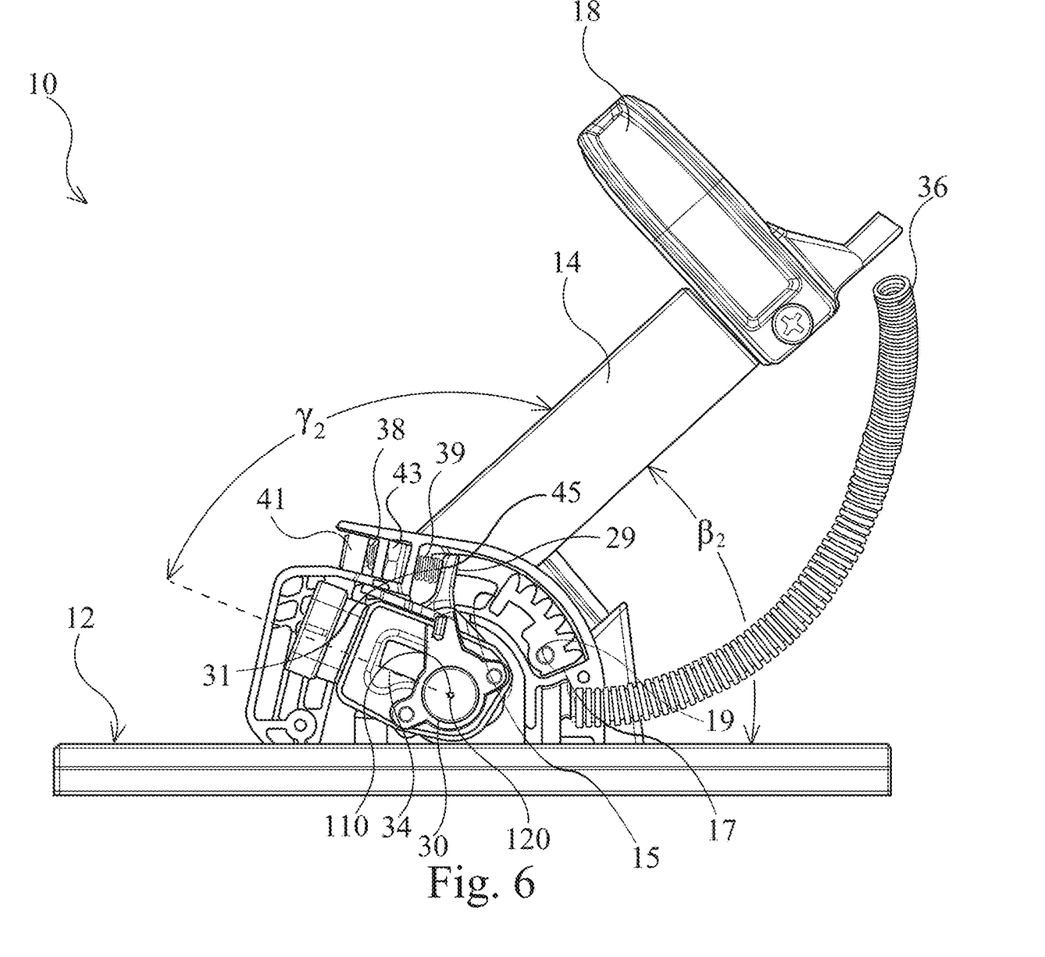
FIG. 6 is a broken-away, side elevation view of the throttle pedal assembly of FIG. 1, showing the pedal of the throttle pedal assembly of FIG. 1 moved from the adjusted idle position to the open throttle position.

However, once the pedal 14 has been adjusted to the adjusted idle position, shown in FIG. 5, when the pedal 14 is moved from the adjusted idle position with the pedal angle of $\alpha_2$, shown in FIG. 5, to the open throttle position with a pedal angle of $\beta_2$, shown in FIG. 6, the pedal 14 is pivoted about the first axis 110 thereby causing the magnet rotor 28 to rotate about the first axis 110. The rotational displacement angle $\gamma_2$ of the magnet 32 is sensed by sensing element 34 which remains stationary when the pedal 14 is moved from the adjusted idle position to the open throttle position. The sensing element 34 then alters the throttle signal, based on the rotational position of the magnet, through wiring 36 to a controller (not shown) which controls throttle based on the throttle signal.

Referring back to FIG. 1, the adjustment member 38 can be easily accessed from outside the support housing 16. This allows an end user to easily adjust the pedal angle in the idle position without altering the throttle curve or throttle travel. This is because there is no relative displacement of the magnet 32 and the sensing element 34 during adjustment.

It will be understood by a person skilled in the art that in the throttle pedal assembly 10 assembly shown in FIGS. 1 to 6 that the magnet 32 moves with the pedal 14, while the sensing element 34 remains stationary, when the pedal 14 is moved from an idle position to an open throttle position. However, in other examples, the sensing element may move with the pedal, while the magnet (or other sensed element) remains stationary relative to the sensing element, when the pedal is moved from an idle position to an open throttle position. Such embodiments may include a carrier similar to the sensor carrier 30 but including the sensed element instead of the sensing element.

Figure 7:
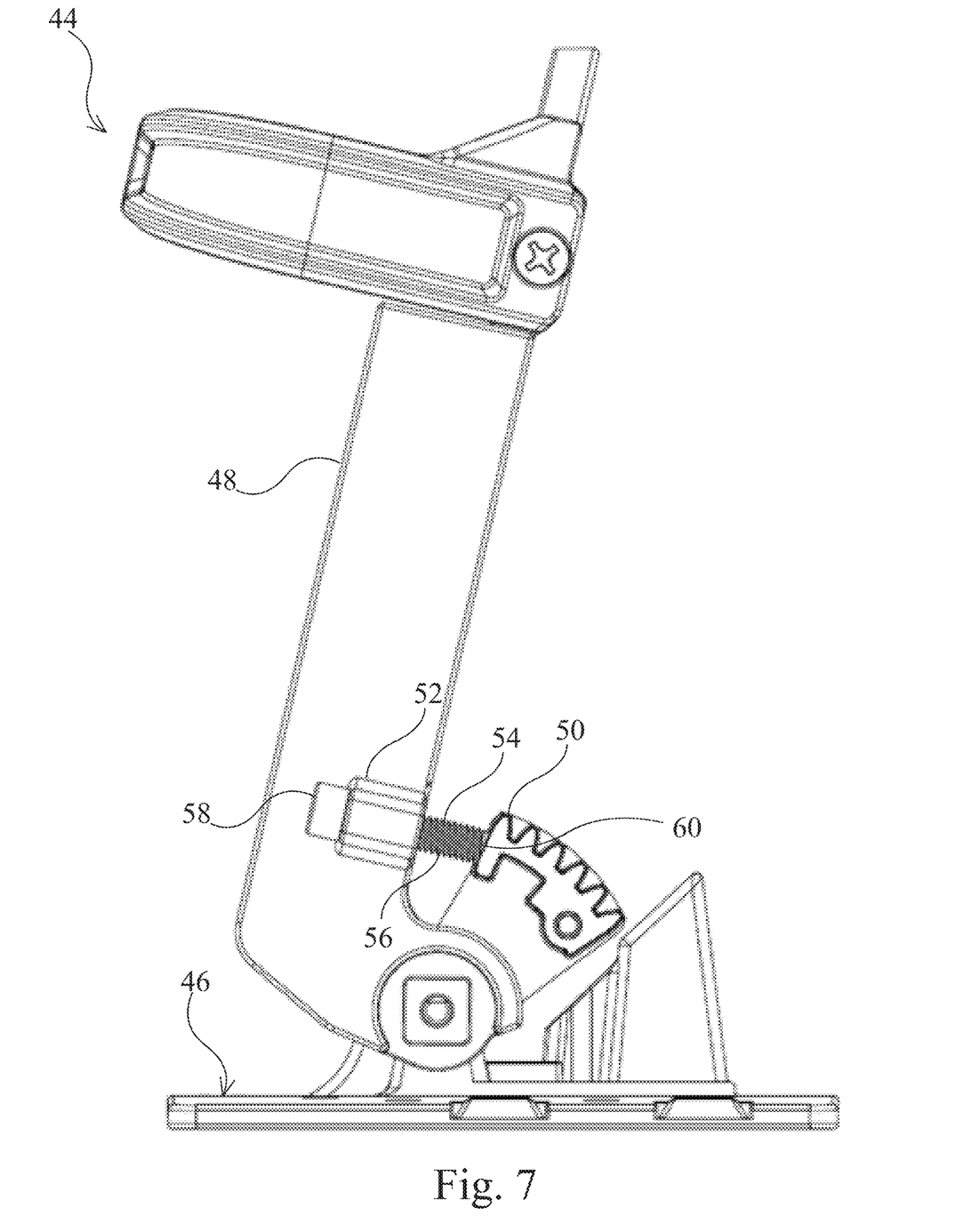
FIG. 7 is a side elevation view of a throttle pedal assembly according to another embodiment, showing a pedal of the throttle pedal assembly of FIG. 7 in an initial idle position.

Referring to FIG. 7, there is shown a throttle pedal assembly 44 according to another embodiment. The throttle pedal assembly 44 generally comprises a base 46, a pedal 48 pivotally mounted (or, more generally, movably mounted) on the base 46, and throttle level body 50 (a sector gear in the embodiment shown, although alternative embodiments may differ) also pivotally mounted (or, more generally, movably mounted) on the base 46. The base 46 may be similar to the base 12 as described above, and the pedal 48 may be similar to the pedal 14 as described above.

A threaded body 52 is held in a fixed position relative to the pedal 48 and defines a threaded opening. An adjustment member 54 includes a threaded shaft 56 coupled to a head 58. The threaded shaft 56 threadedly engages the threaded opening in the threaded body 52. The adjustment member 54 also includes an adjustment surface 60 at an end of the adjustment member 54 opposite the head 58. Rotation of the adjustment member 54 within the threaded opening in the threaded body 52 moves the adjustment member 54, and thus the adjustment surface 60, relative to the threaded body 52 and thus relative to the pedal 48. The threaded body 52 may therefore be referred to as a first reference location fixed relative to the pedal 48, and a distance of the adjustment surface 60 from the first reference location may be adjusted by rotating the adjustment member 54 within the threaded opening in the threaded body 52.

In general, the throttle pedal assembly 44 is operable to indicate a throttle level (for example, by moving a throttle cable or producing a throttle signal) according to relative positions of the base 46 and the throttle level body 50. Therefore, the throttle level body 50 may have a second reference location, the base 46 may have a third reference location, and the throttle pedal assembly 44 is operable to indicate a throttle level according to relative positions of the second reference location of the throttle pedal assembly and the third reference location. For example, the throttle level indicated by the throttle pedal assembly 44 may be proportional to an angular displacement between the throttle level body 50 and the base 46. The throttle level indicated by the throttle pedal assembly 44 may control one or more engines, such as one or more engines of a marine vessel or other vehicle.

A spring or other resilient body (not shown) may provide a constant force to urge the adjustment surface 60 against a surface of the throttle level body 50, such that the adjustment surface 60 engages the surface of the throttle level body 50. However, the adjustment surface 60 may engage the surface of the throttle level body 50 in other ways, for example by direct or indirect attachment of the adjustment surface 60 to the surface of the throttle level body 50. Further, a spring or other resilient body (not shown) may provide a constant force to urge the throttle level body 50 (and thus the pedal 48) towards an idle position, such as an initial idle position shown in FIG. 7.

Figure 8:
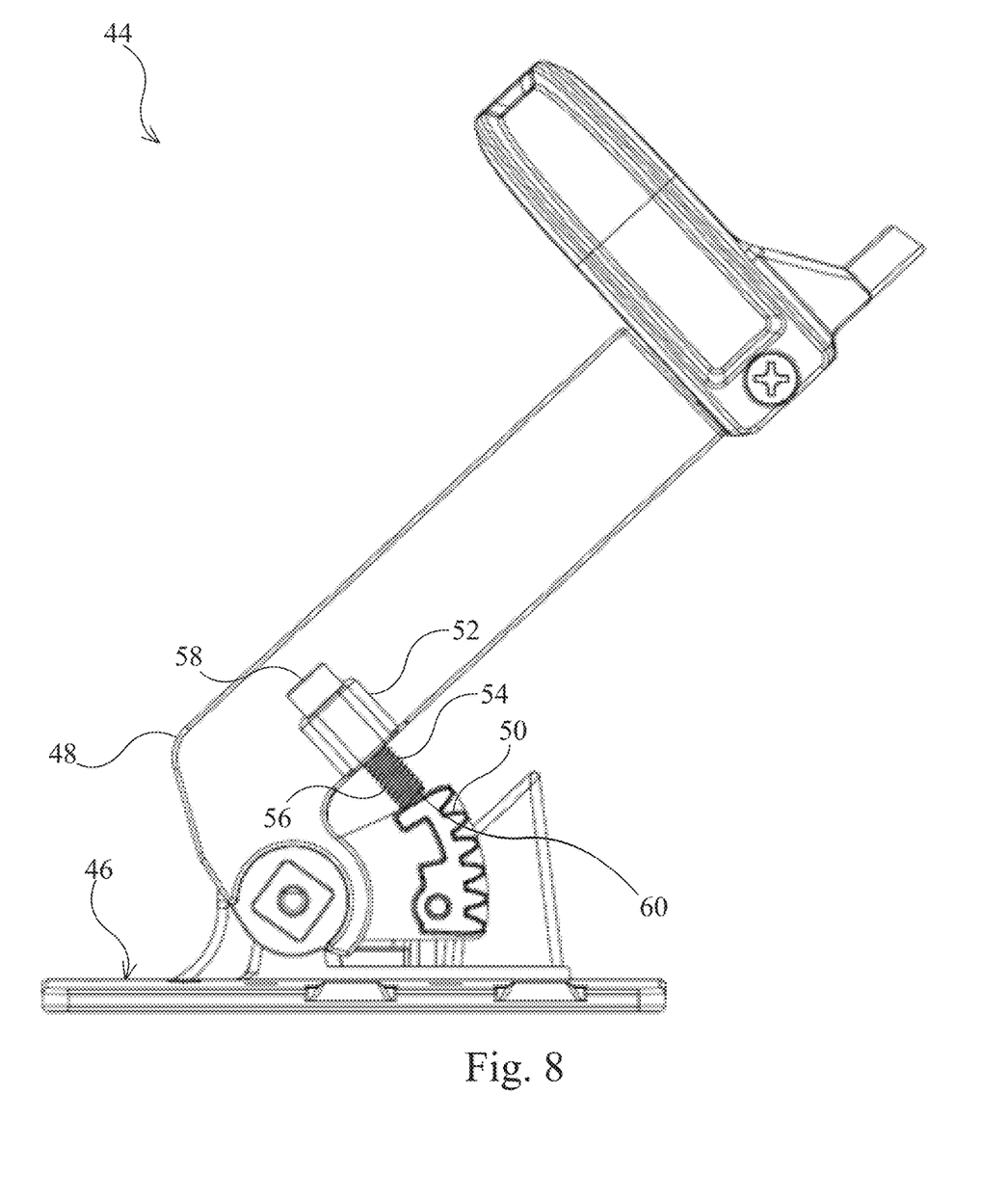
FIG. 8 is a side elevation view of the throttle pedal assembly of FIG. 7, showing the pedal of the throttle pedal assembly of FIG. 7 moved from the initial idle position to an open throttle position.

When the pedal 48 is moved from the initial idle position shown in FIG. 7 to an open throttle position shown in FIG. 8, the pedal 48 moves the throttle level body 50 relative to the base 46, causing the throttle pedal assembly 44 to indicate various throttle levels according to relative positions of the throttle level body 50 (or the second reference location) relative to the base 46 (or the third reference location).

As indicated above, the adjustment surface 60 engages a surface of the throttle level body 50, and a distance of the adjustment surface 60 from the threaded body 52 (or a first reference location fixed relative to the pedal 48) may be adjusted. However, the throttle level body 50 may remain stationary relative to the base 46 as the distance of the adjustment surface 60 from the threaded body 52 is adjusted. Therefore, adjusting the distance of the adjustment surface 60 from the threaded body 52 (for example by rotation of the adjustment member 54 relative to the threaded body 52) may adjust an idle position of the pedal 48 relative to the base 46 while maintaining relative positions of the throttle level body 50 (or the second reference location) and the base 46 (or the third reference location).

Figure 9:
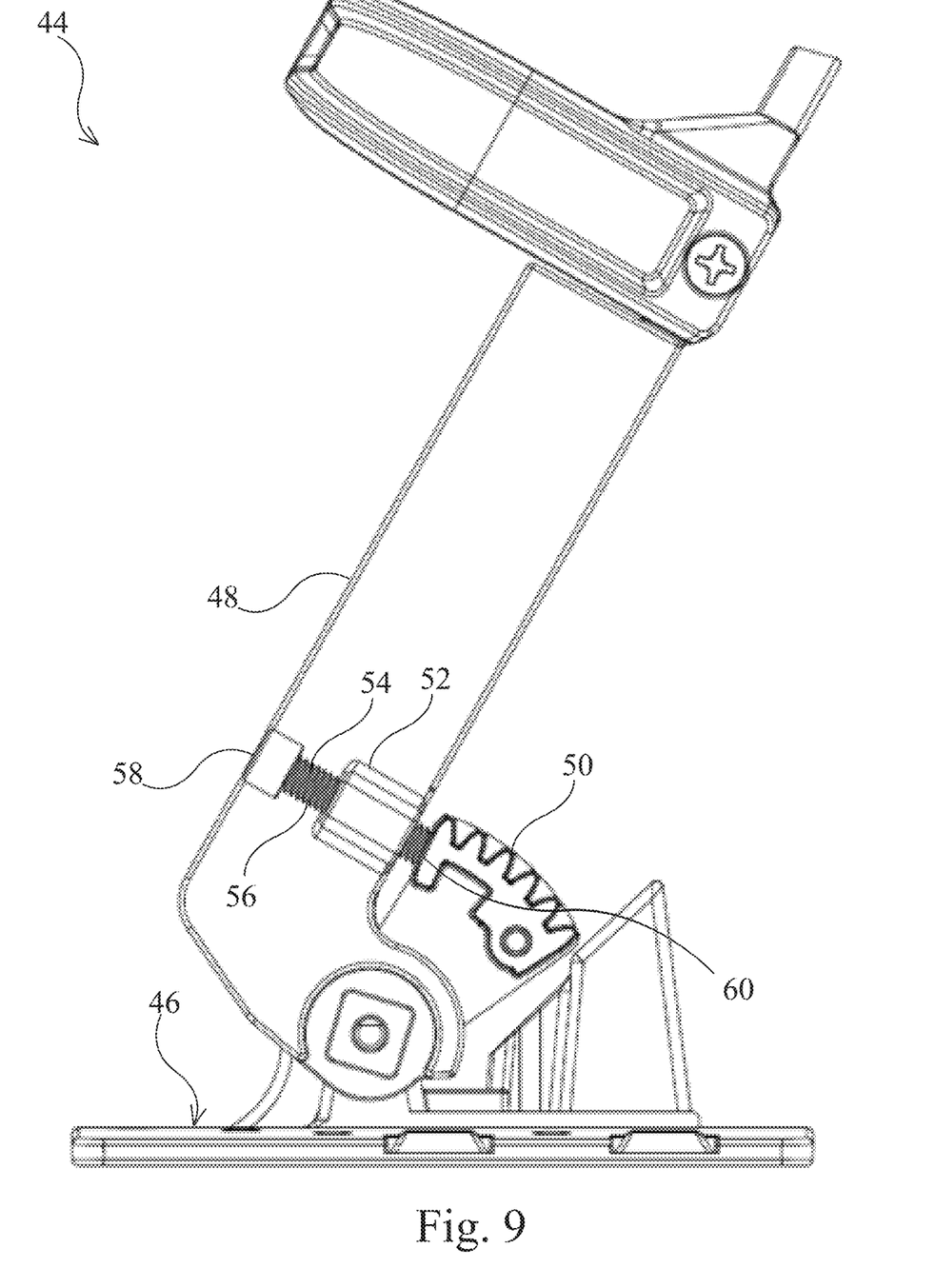
FIG. 9 is a side elevation view of the throttle pedal assembly of FIG. 7, showing the pedal of the throttle pedal assembly of FIG. 7 in an adjusted idle position.
Figure 10:
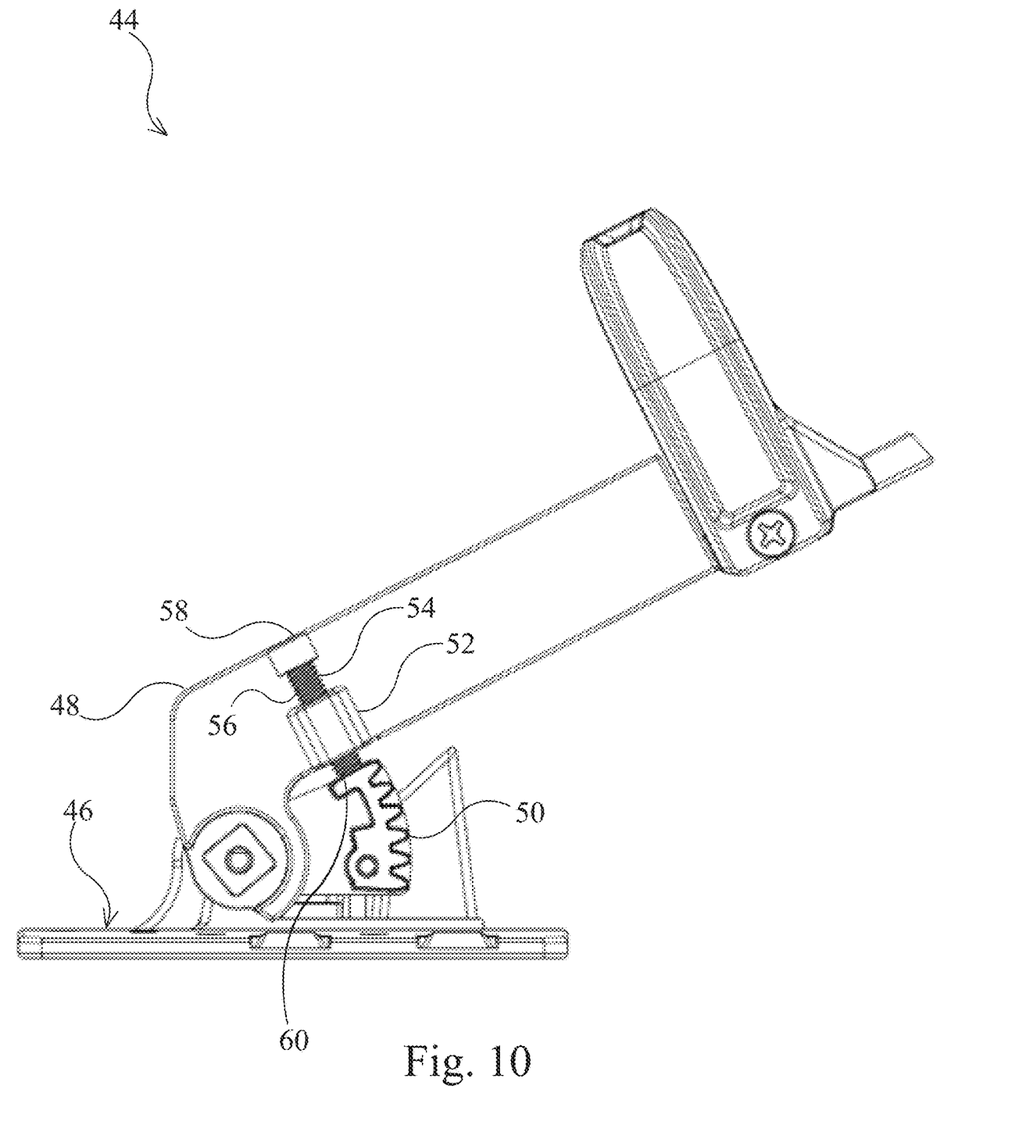
FIG. 10 is a side elevation view of the throttle pedal assembly of FIG. 7, showing the pedal of the throttle pedal assembly of FIG. 7 moved from the adjusted idle position to the open throttle position.

For example, FIG. 9 illustrates the pedal 48 in an adjusted idle position. When the pedal 48 is moved from the adjusted idle position shown in FIG. 9 to the open throttle position shown in FIG. 10, the pedal 48 moves the throttle level body 50 relative to the base 46, causing the throttle pedal assembly 44 to indicate various throttle levels according to relative positions of the throttle level body 50 (or the second reference location) relative to the base 46 (or the third reference location).

In general, an adjustment member such as the adjustment member 38 and the adjustment member 54 may be a longitudinally adjustable adjustment member (by threaded engagement of the adjustment member, for example) such that longitudinal adjustment of the adjustment member (by moving the adjustment member longitudinally relative to the adjustment member or by replacing the adjustment member, for example) moves an adjustment surface (such as the adjustment surface 45 or the adjustment surface 60) of the adjustment member relative to a first reference location, and longitudinally relative to the adjustment member, to cause an idle position of a pedal to move relative to a base while maintaining relative positions of second and third reference locations as described above, for example. In some embodiments, an adjustment surface (such as the adjustment surface 45 or the adjustment surface 60) may be continuously movable relative to a first reference location, such as by threaded engagement of the adjustment member at the first reference location for example, such that a distance of the adjustment surface relative to the first reference location is continuously adjustable. In some embodiments, adjusting a distance of the adjustment surface relative to the first reference location causes a sensing element and a sensed element to rotate (or otherwise move) with the idle position of a pedal. In other embodiments, adjusting a distance of the adjustment surface relative to the first reference location causes the idle position of a pedal to rotate (or otherwise move) relative to a throttle level body such as the throttle level body 50. In general, adjustment of throttle pedal assemblies according to embodiments such as those described above may be preferable to other adjustments of throttle pedal assemblies.

It will be understood by a person skilled in the art that many of the details provided above are by way of example only, and are not intended to limit the scope of the invention which is to be determined with reference to the following claims.

The invention claimed is:

1. A throttle pedal assembly comprising:
a base;
a pedal pivotably mounted on the base and pivotable about a first axis relative to the base; and
an adjustment member extending at least between a first reference location of the throttle pedal assembly and an adjustment surface at an end of the adjustment member, the adjustment member adjustable to adjust an adjustment distance from the first reference location of the throttle pedal assembly to the adjustment surface;
wherein the throttle pedal assembly is operable to indicate a throttle level according to relative positions of a second reference location of the throttle pedal assembly and a third reference location of the throttle pedal assembly;
wherein pivoting the pedal about the first axis relative to the base varies the relative positions of the second and third reference locations and varies the throttle level; and
wherein adjusting the adjustment distance causes an idle position of the pedal to rotate about the first axis relative to the base and maintains relative positions of the second and third reference locations when the pedal is in the idle position.

2. The throttle pedal assembly of claim 1 wherein the adjustment surface is continuously movable relative to the first reference location of the throttle pedal assembly such that the adjustment distance is continuously adjustable.

3. The throttle pedal assembly of claim 1 further comprising:
a sensed element, wherein the second reference location is on the sensed element; and
a sensing element, wherein the third reference location is on the sensing element.

4. The throttle pedal assembly of claim 3 wherein:
the sensed element is coupled to the pedal such that the sensed element rotates about the first axis relative to the base in response to pivoting of the pedal relative to the base about the first axis; and
the sensing element is rotatable about a second axis coaxial with the first axis.

5. The throttle pedal assembly of claim 3 wherein:
the sensing element is coupled to the pedal such that the sensing element rotates about the first axis relative to the base in response to pivoting of the pedal relative to the base about the first axis; and
the sensed element is rotatable relative to the base about a second axis coaxial with the first axis.

6. The throttle pedal assembly of claim 3 wherein the sensed element comprises a magnet.

7. The throttle pedal assembly of claim 1 wherein the first reference location is fixed relative to the base.

8. The throttle pedal assembly of claim 7 wherein the adjustment member is threadedly movable relative to the base.

9. The throttle pedal assembly of claim 1 further comprising a carrier rotatable relative to the base about a second axis coaxial with the first axis, wherein:
the second reference location rotates about the first axis relative to the base in response to pivoting of the pedal relative to the base about the first axis; and
the third reference location is on the carrier.

10. The throttle pedal assembly of claim 9 wherein the carrier comprises a carrier surface engaged with the adjustment surface, and the pedal engages with the adjustment surface when the pedal is in the idle position, such that adjusting the adjustment distance causes:
the idle position of the pedal to rotate about the first axis relative to the base; and
the carrier to rotate with the idle position of the pedal about the second axis relative to the base.

11. The throttle pedal assembly of claim 9 wherein the first reference location is fixed relative to the base.

12. The throttle pedal assembly of claim 1 further comprising a carrier movable relative to the base, wherein:
the second reference location moves relative to the base in response to movement pivoting of the pedal about the first axis relative to the base;
the third reference location is on the carrier; and the carrier comprises a carrier surface engaged with the adjustment surface, and the pedal engages with the adjustment surface when the pedal is in the idle position, such that adjusting the adjustment distance causes:

the idle position of the pedal to rotate about the first axis relative to the base; and the carrier to move with the idle position of the pedal.

13. The throttle pedal assembly of claim 12 further comprising:

a sensed element, wherein the second reference location is on the sensed element; and a sensing element, wherein the third reference location is on the sensing element.

14. The throttle pedal assembly of claim 12 further comprising:

a sensed element, wherein the third reference location is on the sensed element; and a sensing element, wherein the second reference location is on the sensing element.

15. The throttle pedal assembly of claim 1 wherein the first reference location is fixed relative to the pedal.

16. The throttle pedal assembly of claim 15 wherein the adjustment member is threadedly movable relative to the pedal.

17. The throttle pedal assembly of claim 1 further comprising a throttle level body movably mounted on the base, wherein:

the second reference location is on the throttle level body; and the third reference location is fixed relative to the base.

18. The throttle pedal assembly of claim 17 wherein the throttle level body is rotatable relative to the base about a second axis coaxial with the first axis.

19. The throttle pedal assembly of claim 17 wherein the adjustment surface engages a surface of the throttle level body such that adjusting the adjustment distance causes the idle position of the pedal to rotate about the first axis relative to the base and relative to the throttle level body.

20. The throttle pedal assembly of claim 17 wherein the first reference location is fixed relative to the pedal.

* * * * *